United States Patent
Hong et al.

(10) Patent No.: US 9,158,050 B2
(45) Date of Patent: Oct. 13, 2015

(54) POLARIZER HAVING HIGH DURABILITY AND METHOD OF FABRICATING THE SAME

(71) Applicants: Wan Taek Hong, Uiwang-si (KR); Sang Do Lee, Uiwang-si (KR); Hae Ryong Chung, Uiwang-si (KR)

(72) Inventors: Wan Taek Hong, Uiwang-si (KR); Sang Do Lee, Uiwang-si (KR); Hae Ryong Chung, Uiwang-si (KR)

(73) Assignee: CHEIL INDUSTRIES, INC., Gumi-si, Kyeongsangbuk-do (KR)

( * ) Notice: Subject to any disclaimer, the term of this patent is extended or adjusted under 35 U.S.C. 154(b) by 224 days.

(21) Appl. No.: 13/724,341

(22) Filed: Dec. 21, 2012

(65) Prior Publication Data

US 2013/0163079 A1    Jun. 27, 2013

(30) Foreign Application Priority Data

Dec. 23, 2011 (KR) .................. 10-2011-0141791

(51) Int. Cl.
*G02B 5/30* (2006.01)

(52) U.S. Cl.
CPC ............... *G02B 5/30* (2013.01); *G02B 5/3033* (2013.01)

(58) Field of Classification Search
CPC .................................. G02B 5/30; G02B 5/3033
USPC ........................ 359/483.01; 349/96
See application file for complete search history.

(56) References Cited

U.S. PATENT DOCUMENTS

| 7,589,804 B2 * | 9/2009 | Tawaraya et al. ............. 349/106 |
| 8,313,605 B2 * | 11/2012 | Yamamoto et al. ........... 156/248 |
| 8,404,066 B2 * | 3/2013 | Goto et al. ..................... 156/229 |
| 8,411,360 B2 * | 4/2013 | Kitagawa et al. ........ 359/487.06 |
| 8,529,241 B2 * | 9/2013 | Fujita ............................ 425/367 |
| 2008/0225210 A1 * | 9/2008 | Shimoda et al. ................ 349/96 |
| 2008/0286455 A1 * | 11/2008 | Hamamoto ................ 427/163.1 |
| 2011/0019273 A1 * | 1/2011 | Feng et al. ..................... 359/485 |
| 2012/0257147 A1 * | 10/2012 | Shibata .......................... 349/96 |

FOREIGN PATENT DOCUMENTS

| JP | 2008-15000 A | 1/2008 |
| KR | 10-2007-0088353 A | 8/2007 |
| KR | 10-2010-0106121 A | 10/2010 |

OTHER PUBLICATIONS

Korean Office Action dated May 24, 2014.

* cited by examiner

*Primary Examiner* — Frank Font
(74) *Attorney, Agent, or Firm* — Lee & Morse, P.C.

(57) ABSTRACT

The present disclosure provides a polarizer having a transmittance of about 45% or more and a transmittance distribution of about 0.3% or less.

10 Claims, 1 Drawing Sheet

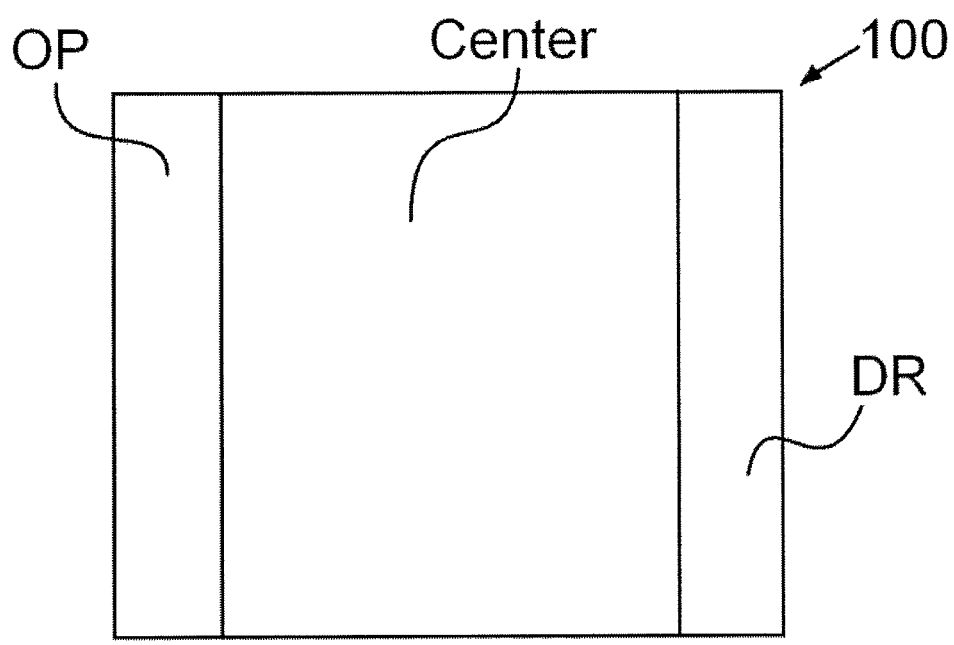

POLARIZER HAVING HIGH DURABILITY AND METHOD OF FABRICATING THE SAME

CROSS-REFERENCE TO RELATED APPLICATION

The present application claims priority under 35 U.S.C. §119 to Korean Patent Application No. 10-2011-0141791, filed on Dec. 23, 2011, in the Korean Intellectual Property Office, and entitled: "Polarizer Having High Durability and Method of Fabricating the Same," which is incorporated by reference herein in its entirety.

BACKGROUND

1. Field

Embodiments relate to a polarizer and a method of fabricating the same.

2. Description of the Related Art

Currently, liquid crystal displays (LCDs) are among the most widely used flat panel displays. The LCD includes an LCD panel, which includes two display panels each having electric field generating electrodes and a liquid crystal layer interposed therebetween. The LCD displays an image by applying voltage across the electrodes to generate an electric field in the liquid crystal layer so as to determine orientations of liquid crystal molecules in the liquid crystal layer while controlling polarization of incident light.

A polarizing plate is disposed outside the LCD panel. The polarizing plate can control polarization of light by selectively transmitting a light component in a specific direction therethrough among light emitted from a backlight unit and light having passed through the liquid crystal layer.

Generally, a polarizing plate includes a polarizer capable of polarizing light in a specific orientation and a protective layer for supporting and protecting the polarizer.

SUMMARY

Embodiments are directed to a polarizer having a transmittance of about 45% or more and a transmittance distribution of about 0.3% or less. The transmittance and transmittance distribution of the polarizer are measured at wavelengths of about 350 nm to about 750 nm.

The polarizer may have a Poisson's ratio of about 0.1 or less. The polarizer may have a Poisson's ratio of about 0.05 to about 0.10.

The polarizer may have a Young's modulus of about 90 MPa or more.

Embodiments are also directed to a method of manufacturing a polarizer that includes swelling, dyeing, cleaning, and stretching a polyvinyl alcohol film to form a polarizer, wherein the polyvinyl alcohol film is stretched at a stretch ratio of about 0.35 to about 1 during the cleaning.

A ratio of a stretch ratio during the cleaning to a stretch ratio immediately after the cleaning may range from about 1:1.05 to 1:1.5.

A polarizing plate may include the protective film stacked on at least one side of the polarizer.

BRIEF DESCRIPTION OF THE DRAWING

Features will become apparent to those of skill in the art by describing in detail exemplary embodiments with reference to the attached drawing in which:

FIG. 1 illustrates OP/Center/DR portions of a polarizer for determining transmittance.

DETAILED DESCRIPTION

Example embodiments will now be described more fully hereinafter with reference to the accompanying drawing; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing FIGURE, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

An embodiment may be directed to a polarizer that has a transmittance of about 45% or more and a transmittance distribution of about 0.3% or less.

The transmittance of the polarizer may be measured at wavelengths of about 350~750 nm using a V-7100 available from JASCO Co., Ltd. The term "transmittance of about 45% or more" refers to an average value of transmittances at OP/Center/DR portions of the polarizer. As shown in FIG. 1, the term "OP portion of the polarizer 100" refers to a portion of the polarizer 100 at which an operator runs a machine, the term "DR portion" refers to a portion of the polarizer at which a motor actuator is located, and the term "Center portion" refers to a portion of the polarizer between the OP and DR portions. Each of the OP and DR portions may occupy about 30% of a total length of the polarizer from one end thereof.

Although the OP/Center/DR portions of the polarizing plate theoretically have the same transmittance, the Center portion may have a higher transmittance than the OP/DR portions due to a bowing phenomenon. Herein, the term "transmittance distribution" refers to a difference value between the transmittances (Ts) at the OP/DR portions and the transmittance (Tc) at the Center portion. According to an embodiment, the polarizer may have a transmittance distribution of about 0.3% or less, for example, about 0.2% or less, or, for example, about 0.1% or less.

In order to minimize the transmittance distribution, a thickness distribution of the polarizer in a width direction may be adjusted. According to an embodiment, in order to control the transmittance and the thickness distribution, the stretching rate may be increased in a cleaning bath and may be decreased in a stretching bath. That is, generally, a film, such as a polyvinyl alcohol (PVA) film, swollen in water, may be predominantly stretched in the stretching bath. In this case, stretching may occur in a zone where variation in the Poisson's ratio of the PVA film is high. Accordingly, the thickness distribution may become severe in the width direction. In contrast, according to an embodiment, the stretching rate may be determined in a zone where the variation in the Poisson's ratio of the PVA film is minimized.

The polarizer according to an embodiment may be fabricated by swelling, dyeing, cleaning, and stretching a polyvinyl alcohol film.

Swelling may be performed in a suitable manner. For example, a polyvinyl alcohol film may be swollen in a swelling bath at about 22° C. to about 35° C. to remove foreign matter from the surface of the polyvinyl alcohol film or to assist dyeing of the film. The swelling bath may contain water or chloride, boracic acid, an inorganic acid, an organic acid, and the like.

In some implementations, the polyvinyl alcohol film may be stretched in the swelling bath. For example, the polyvinyl alcohol film may be stretched at a stretch ratio of about 1.1 to about 1.6 in the swelling bath. In some implementations, stretching of the film may not be performed during the swelling.

The swollen polyvinyl alcohol film may be subjected to dyeing in a suitable manner. Dyeing is a process of introducing dichroic iodine, dyes or pigments into the polyvinyl alcohol film to dye the film. In some implementations, dyeing may be performed at about 20° C. to about 40° C. The film may be stretched at a stretch ratio of about 1.5 to about 2.2 during dyeing. In some implementations, stretching of the film may not be performed during the dyeing.

The dyed polyvinyl alcohol film may be subjected to cleaning. The polyvinyl alcohol film may be stretched at a stretch ratio of about 0.35 to about 1 during cleaning. By stretching the film within this range of stretch ratio, the transmittance and thickness distribution of the film may be regulated.

After cleaning, the dyed polyvinyl alcohol film may sequentially subjected to primary stretching, secondary stretching, and tertiary stretching. A ratio of the stretch ratio during cleaning to the stretch ratio during primary stretching immediately after cleaning may range from about 1:1.05 to about 1:1.5. Within this range, the film may have a minimized transmittance distribution.

The primary stretching may provide a stretch ratio of about 0.5 to about 1.0, and the secondary stretching may provide a stretch ratio of about 0.8 to about 1.2. Further, the tertiary stretching may provide a stretch ratio of about 0.85 to about 1.2. A relationship of the stretch ratios in the primary to tertiary stretching may be expressed by D1<D2≤D3 (where D1 is a stretch ratio in primary stretching, D2 is a stretch ratio in secondary stretching, and D3 is a stretch ratio in tertiary stretching).

For example, the stretch ratios may be adjusted to have a total stretch ratio from about 5 to about 6.7, for example, from about 5.8 to about 6.4.

According to an embodiment, the polarizer may have a thickness of about 0.5 μm to about 400 for example, about 5 μm to about 200 μm.

The polarizer may have a Poisson's ratio of about 0.1 or less, for example, about 0.05 to about 0.10. The Poisson's ratio can be obtained by adjusting the stretch ratio in each process. The Poisson's ratio may be calculated by Equation 1:

$$\nu = -\epsilon x/\epsilon y \quad \text{(Equation 1)}$$

(wherein ν is Poisson's ratio, $\epsilon x$ is strain in the x-axis direction, and $\epsilon y$ is strain in the y-axis direction)

According to an embodiment, the polarizer may have a Young's modulus of about 90 MPa or more, for example, about 95 MPa to about 120 MPa.

Embodiments are also directed to a polarizing plate. In some implementation, the polarizing plate includes a polarizer and a protective film that is attached to at least one side of the polarizer. The protective film may function as a phase retardation film, a brightness improving film, a reflective film, a translucent reflective film, a diffusive film, an optical compensation film, or the like. In some implementations, additional films providing these functions may be further stacked on the protective film. In some implementations, the protective film may have a thickness of about 50 μm to about 400 μm, for example, about 70 μm to about 200 μM. The protective film may be stacked on the polarizer via adhesives.

The following Examples and Comparative Examples are provided in order to highlight characteristics of one or more embodiments, but it is to be understood that the Examples and Comparative Examples are not to be construed as limiting the scope of the embodiments, nor are the Comparative Examples to be construed as being outside the scope of the embodiments. Further, it is to be understood that the embodiments are not limited to the particular details described in the Examples and Comparative Examples.

EXAMPLES

Examples 1 to 4 and Comparative Example 1

PVA samples were prepared through a series of processes from swelling to drying 75 μm thick PVA films [PS-75 (KURARAY)] under the same chemical conditions and temperature while changing only a stretch ratio in each stage as shown in Table 1, thereby preparing polarizers. Immediately after drying, the thickness of the samples were measured by a thickness measurer (SZ70-2).

TABLE 1

| | Stretch ratio in each stage (Total stretch ratio: 6.23) | | | | | |
|---|---|---|---|---|---|---|
| | Swelling | Dyeing | Cleaning | Primary stretching | Secondary stretching | Tertiary stretching |
| Example 1 | — | — | 0.49 | 0.7 | 0.86 | 1.0 |
| Example 2 | — | — | 0.70 | 0.87 | 1.0 | 1.0 |
| Example 3 | — | — | 0.56 | 0.7 | 0.86 | 1.0 |
| Example 4 | — | — | 0.64 | 0.7 | 0.86 | 1.0 |
| Comparative Example 1 | — | — | 0.31 | 0.7 | 1.0 | 1.0 |

The prepared polarizers were sampled directly after drying, were packed in an aluminum package, and were cut at OP/Center/DR portions thereof using a film cutter. Transmittance was measured using a V-7100 (JASCO Co., Ltd). Young's modulus was measured using a 5900 series tester (Instron Inc.). Poisson's ratio was calculated by measuring the widthwise shrinkage rate relative to the stretch ratio. Respective measurements were obtained by averaging 10 samples for each of the Examples and the Comparative Example. The results are shown in Table 2.

TABLE 2

| | Transmittance at OP/DR (Ts, % T) | Transmittance at Center (Tc, % T) | Transmittance distribution (%) | Modulus (MPa) | Poisson's Ratio |
|---|---|---|---|---|---|
| Example 1 | 45.20 | 45.28 | 0.08 | 95.0 | 0.094 |
| Example 2 | 45.23 | 45.32 | 0.09 | 102.05 | 0.090 |

TABLE 2-continued

|  | Transmittance at OP/DR (Ts, % T) | Transmittance at Center (Tc, % T) | Transmittance distribution (%) | Modulus (MPa) | Poisson's Ratio |
| --- | --- | --- | --- | --- | --- |
| Example 3 | 46.11 | 46.17 | 0.06 | 111.0 | 0.072 |
| Example 4 | 46.25 | 46.40 | 0.15 | 100.4 | 0.097 |
| Comparative Example 1 | 45.20 | 46.22 | 1.02 | 84.1 | 0.104 |

From Table 2, it can be seen that the polarizers of Examples 1 to 4, having increased stretch ratios upon cleaning, showed a transmittance distribution of 0.3% or less, an excellent Young's modulus and a Poisson's ratio of 0.1 or less. In contrast, the polarizer of Comparative Example 1, having a higher stretch ratio, showed a transmittance distribution of above 0.3%, a relatively low Young's modulus, and a Poisson's ratio of above 0.1.

By way of summation and review, in a polyvinyl alcohol (PVA) film stretching process in the formation of a polarizing plate, a PVA film, may be prepared through chemical dipping and uniaxial stretching. The PVA film may generally have a thickness distribution in a width direction thereof. In the PVA stretching process, the thickness distribution may inevitably occur due to a bowing phenomenon occurring upon stretching the swollen PVA film. Generally, the thickness distribution increases with increasing stretching speed or width of the film.

Biaxial stretching and uniaxial transverse stretching have been used in an attempt to improve the thickness distribution. However, these methods may not be suited to an existing method of forming a polarizing plate and thus may require the installation of new equipment. Therefore, a technique to improve the thickness distribution in a width direction of a polarizing plate is desirable.

Embodiments disclosed herein provide a polarizer, in which a thickness deviation and transmittance distribution are minimized at a transmittance of 45% or more by setting a stretch ratio within a specified range in a cleaning stage. The polarizer may improve a widthwise transmittance distribution and may have an increased modulus. Embodiments also provide a method of fabricating the polarizer.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope as set forth in the following claims.

What is claimed is:

1. A polarizer having a transmittance of about 45% or more and a transmittance distribution of about 0.3% or less.

2. The polarizer as claimed in claim 1, wherein the polarizer has a Poisson's ratio of about 0.1 or less.

3. The polarizer as claimed in claim 1, wherein the polarizer has a Poisson's ratio ranging from about 0.05 to about 0.10.

4. The polarizer as claimed in claim 1, wherein the polarizer has a Young's modulus of about 90 MPa or more.

5. The polarizer as claimed in claim 1, wherein the transmittance and transmittance distribution of the polarizer are measured at wavelengths of about 350 nm to about 750 nm.

6. A polarizing plate comprising a protective film stacked on at least one side of the polarizer as claimed in claim 1.

7. A polarizing plate comprising a protective film stacked on at least one side of the polarizer as claimed in claim 2.

8. A polarizing plate comprising a protective film stacked on at least one side of the polarizer as claimed in claim 3.

9. A polarizing plate comprising a protective film stacked on at least one side of the polarizer as claimed in claim 4.

10. A method of manufacturing a polarizer, the method comprising:
   swelling, dyeing, cleaning, and stretching a polyvinyl alcohol film to form a polarizer, wherein:
   the polyvinyl alcohol film is stretched at a stretch ratio of about 0.35 to about 1 during the cleaning, and
   a ratio of the stretch ratio during the cleaning to a stretch ratio immediately after the cleaning ranges from about 1:1.05 to 1:1.5.

* * * * *